United States Patent
Uno

(10) Patent No.: US 10,075,832 B2
(45) Date of Patent: Sep. 11, 2018

(54) COMMUNICATION DEVICE, METHOD FOR CONTROLLING COMMUNICATION DEVICE, AND STORAGE MEDIUM

(71) Applicant: CANON KABUSHIKI KAISHA, Tokyo (JP)

(72) Inventor: Kazutaka Uno, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/830,471

(22) Filed: Dec. 4, 2017

(65) Prior Publication Data

US 2018/0176715 A1  Jun. 21, 2018

(30) Foreign Application Priority Data

Dec. 20, 2016  (JP) ................................ 2016-246227

(51) Int. Cl.
| | |
|---|---|
| *H04B 7/00* | (2006.01) |
| *H04W 4/80* | (2018.01) |
| *H04W 4/00* | (2018.01) |
| *H04W 8/24* | (2009.01) |
| *H04W 8/20* | (2009.01) |

(52) U.S. Cl.
CPC ............. *H04W 4/80* (2018.02); *H04W 4/008* (2013.01); *H04W 8/205* (2013.01); *H04W 8/24* (2013.01)

(58) Field of Classification Search
None
See application file for complete search history.

(56) References Cited

U.S. PATENT DOCUMENTS

| | | | | |
|---|---|---|---|---|
| 7,664,495 | B1 * | 2/2010 | Bonner | H04W 4/16 370/338 |
| 7,940,908 | B2 * | 5/2011 | Sprigg | H04M 3/42042 379/201.01 |
| 9,571,148 | B2 * | 2/2017 | Olson | H04B 1/3877 |
| 9,578,177 | B2 * | 2/2017 | Barkan | |
| 9,659,484 | B1 * | 5/2017 | Mehta | H04W 4/90 |
| 9,801,158 | B1 * | 10/2017 | Yuan | H04W 68/02 |
| 9,820,085 | B1 * | 11/2017 | Telang | H04W 76/14 |
| 9,848,284 | B2 * | 12/2017 | Golla | H04W 4/008 |
| 9,955,448 | B2 * | 4/2018 | Zhang | H04W 8/205 |
| 2016/0277891 | A1 * | 9/2016 | Dvortsov | H04W 4/008 |
| 2017/0180911 | A1 * | 6/2017 | Burton | H04W 4/70 |
| 2017/0181017 | A1 * | 6/2017 | Tenny | H04W 24/08 |
| 2017/0265080 | A1 * | 9/2017 | Azam | H04W 12/08 |
| 2018/0070201 | A1 * | 3/2018 | Golla | H04W 12/04 |

FOREIGN PATENT DOCUMENTS

JP     2015-233209 A    12/2015

* cited by examiner

*Primary Examiner* — Tuan A Tran
(74) *Attorney, Agent, or Firm* — Canon U.S.A., Inc. IP Division

(57) ABSTRACT

A communication device includes a transmitting unit configured to transmit, to a second communication device having no voice call function, subscriber information through predetermined wireless communication without using a mobile communication network, a receiving unit configured to receive an incoming call notification message directed to a phone number in the subscriber information from the second communication device through the predetermined wireless communication, and a communication unit configured to communicate voice data with the second communication device by using the predetermined wireless communication upon receiving an incoming call notification message.

19 Claims, 9 Drawing Sheets

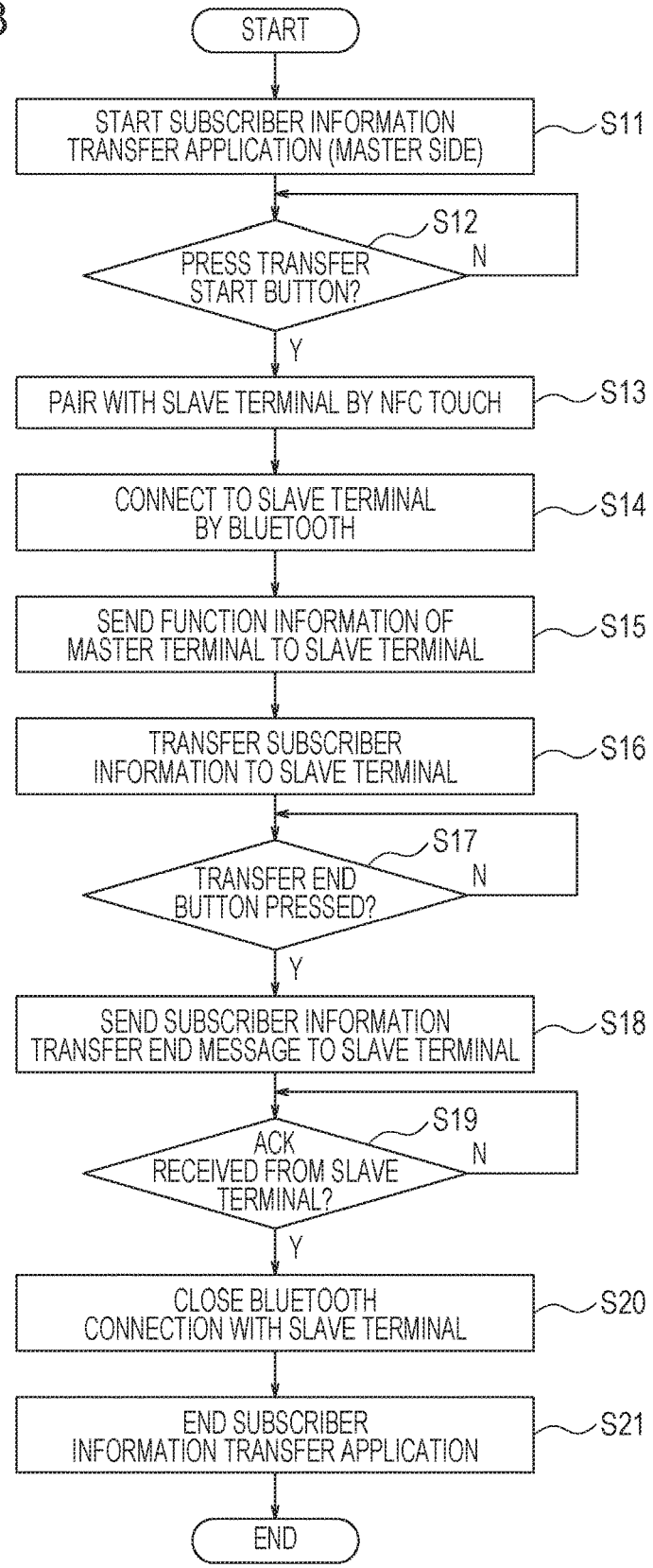

FIG. 4A

| FUNCTION | SUPPORT STATUS |
|---|---|
| VOICE CALL | SUPPORTED |
| SMS | SUPPORTED |
| PACKET COMMUNICATION | SUPPORTED |
| TETHERING | SUPPORTED |

FIG. 4B

| FUNCTION | SUPPORT STATUS |
|---|---|
| VOICE CALL | UNSUPPORTED |
| SMS | UNSUPPORTED |
| PACKET COMMUNICATION | SUPPORTED |
| TETHERING | UNSUPPORTED |

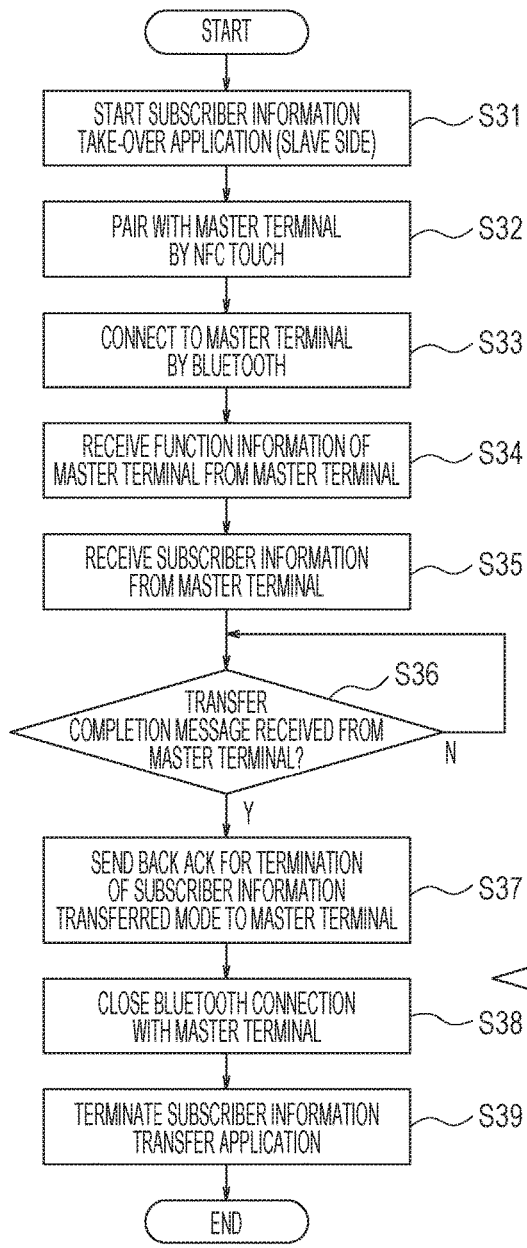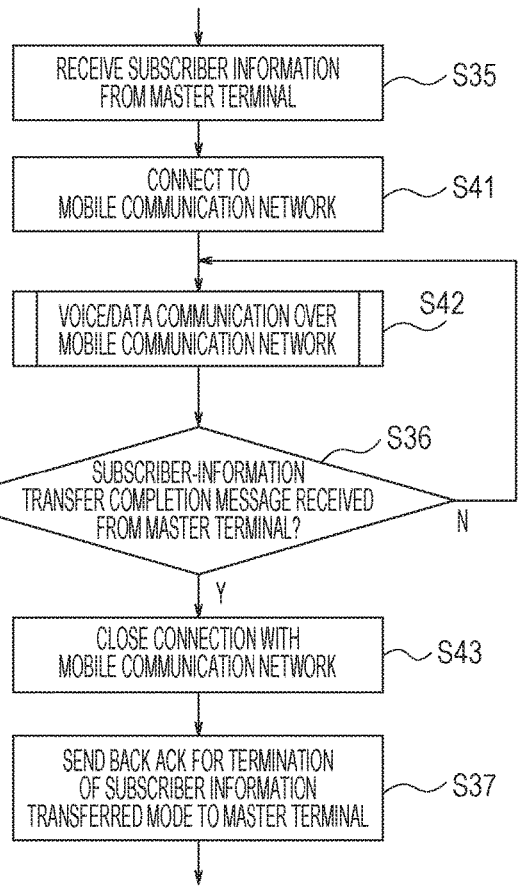

COMMUNICATION DEVICE, METHOD FOR CONTROLLING COMMUNICATION DEVICE, AND STORAGE MEDIUM

BACKGROUND OF THE INVENTION

Field of the Invention

The aspect of the embodiments relates to a communication device and a method for controlling a communication device.

Description of the Related Art

In recent years, cell phones (typically, smartphones) have become more multifaceted. In addition, terminals or devices other than a cell phone, such as a wearable terminal or a digital video camera, have had a communication terminal function for connecting to a public line, such as LTE (Long Term Evolution). Accordingly, the number of users who possess a plurality of communication terminals (including terminals and devices equipped with the communication terminal functions) has been increasing.

To connect a communication terminal to a public line and use the communication terminal, it is common to, for example, install a Subscriber Identity Module (SIM) card in the communication terminal. As described above, when a user who possesses a plurality of communication terminals uses different communication terminals, the user needs to remove the SIM card from the currently used communication terminal and install the SIM in the new communication terminal or needs to install a SIM card with a contract in each of the communication terminals, resulting in troublesome operations and an expensive access fee. In order to avoid such complications, a technique for enabling communication without swapping the SIM card among a plurality of communication terminals has been developed. More specifically, a technology for wirelessly transmitting subscriber information to another communication terminal, which uses the information, has been developed. At this time, the subscriber information includes the phone number in the SIM card, IMSI which is a subscriber identification number, and the ID and password stored in an applet inside the SIM. IMSI stands for "International Mobile Subscriber Identity". Japanese Patent Laid-Open No. 2015-233209 describes the following technology. That is, the subscriber information retained by a wearable terminal that does not have a mobile communication function is wirelessly sent to a communication terminal capable of performing mobile communication. Thereafter, the communication terminal performs voice call processing through mobile communication by using the subscriber information.

Let's consider the following example: By using the above-described technique, a communication terminal (e.g., a cell phone) that retains the subscriber information for performing mobile communication transfers the subscriber information to another communication terminal (e.g., a digital video camera or a wearable terminal) that cannot perform voice call processing. As used herein, the term "transfer" refers to a situation in which after one communication terminal sends the subscriber information to the other communication terminal, only the communication terminal that has received the subscriber information can use the subscriber information.

After a cell phone transfers the subscriber information to a wearable terminal, there may be an incoming call directed to the phone number in the subscriber information. In such cases, since the wearable terminal cannot perform voice call processing, the wearable terminal cannot answer the incoming call. As a result, appropriate incoming call processing and voice call processing cannot be performed. In addition, since the cell phone cannot use the subscriber information, the cell phone cannot answer any incoming call and cannot perform voice call processing.

SUMMARY OF THE INVENTION

According to an aspect of the embodiments, a communication device having subscriber information includes a transmitting unit configured to transmit, to a second communication device having no voice call function, subscriber information through predetermined wireless communication without using a mobile communication network, a receiving unit configured to receive an incoming call notification message directed to a phone number in the subscriber information from the second communication device through the predetermined wireless communication, and a communication unit configured to communicate voice data with the second communication device by using the predetermined wireless communication upon receiving an incoming call notification message.

Further features of the disclosure will become apparent from the following description of exemplary embodiments with reference to the attached drawings.

BRIEF DESCRIPTION OF THE DRAWINGS

FIG. 3 illustrates an overall process flow performed by a master terminal according to the embodiment of the disclosure.

FIGS. 4A and 4B illustrate an example of function information of the master terminal.

FIGS. 5A and 5B illustrate an overall process flow performed by a slave terminal according to the embodiment of the disclosure.

DESCRIPTION OF THE EMBODIMENTS

Exemplary embodiments of the disclosure are described in detail below with reference to the accompanying drawings. The embodiments described below are merely examples of means for implementing the disclosure, and the embodiments should be modified or changed appropriately in accordance with the configuration of an apparatus to which the disclosure is applied and a variety of conditions, and the scope of the disclosure should not be limited to the embodiments described below.

First Exemplary Embodiment

Figure 1:
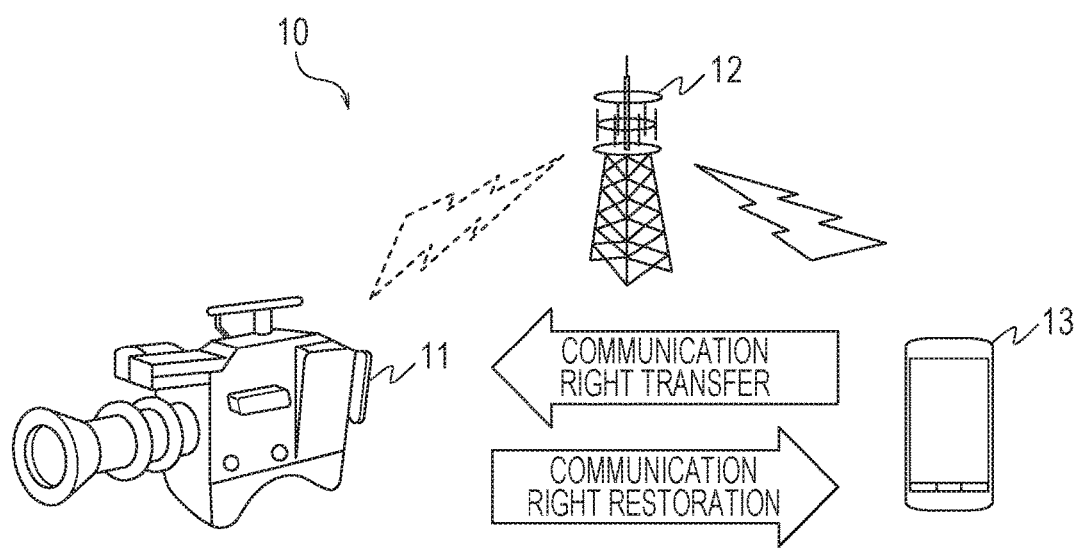
FIG. 1 illustrates a communication system including a communication device according to an embodiment of the disclosure.

FIG. 1 illustrates the configuration of a communication system 10 including two communication devices (a video camera 11 and a smartphone 13) according to the present exemplary embodiment. The communication system 10 according to the present exemplary embodiment includes the video camera 11, a mobile communication network 12, and the smartphone 13. The mobile communication network 12 can be connected to another terminal (not illustrated). An example of another terminal is a caller terminal described below. The video camera 11 and the smartphone 13 are devices (communication devices) capable of performing mobile communication (communication via the mobile communication network 12) on the basis of the same subscriber information.

The smartphone 13 is capable of transferring (transmitting) the subscriber information held therein to the video camera 11 via a communication path that differs from the mobile communication network and restoring the transferred subscriber information. The video camera 11 and the smartphone 13 can perform mobile communication (communication with another terminal (not illustrated)) through the transfer and restoration of subscriber information. The subscriber information includes information required for performing mobile communication, such as a cell phone number and IMSI representing an international subscriber identification number issued to the subscriber of the cell phone. An arrow of transfer of the communication right and an arrow of restoration of the communication right illustrated in FIG. 1 indicate the way in which the subscriber information is transferred and restored between the video camera 11 and the smartphone 13.

Figure 2:
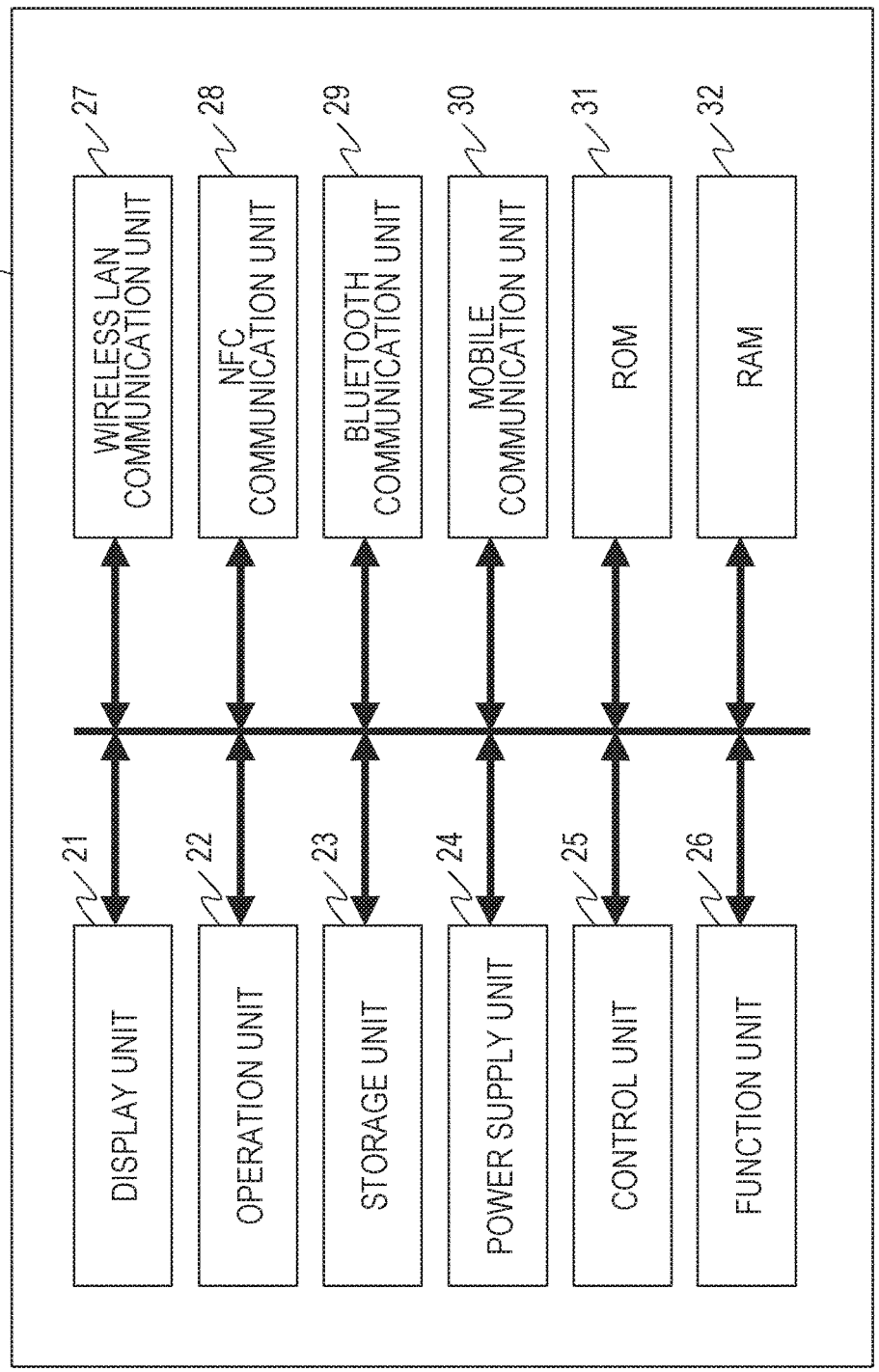
FIG. 2 illustrates the configuration of the communication device in FIG. 1.

The configurations of the video camera 11 and the smartphone 13, which are the communication devices according to the present exemplary embodiment, are described below with reference to FIG. 2. The communication device (the video camera 11, the smartphone 13) includes a display unit 21, an operation unit 22, a storage unit 23, a power supply unit 24, a control unit 25, and a function unit 26. The communication device (the video camera 11, the smartphone 13) further includes a wireless LAN communication unit 27, an NFC communication unit 28, a Bluetooth™ communication unit 29, a mobile communication unit (a public wireless communication unit) 30, a read only memory (ROM) 31, and a random access memory (RAM) 32. LAN stands for Local Area Network. NFC stands for Near Field Communication. Bluetooth includes Bluetooth version 4 or later (e.g., Bluetooth Low Energy).

The display unit 21 includes, for example, an LCD or an LED. The display unit 21 has a function of outputting visually perceptible information by the user and performs control of displaying a variety of UIs. LCD stands for Liquid Crystal Display. LED stands for Light Emitting Diode. UI stands for User Interface.

The operation unit 22 has a function that enables the user to perform a variety of input operations and operate the communication device (11, 13). The display unit 21 and the operation unit 22 may be integrated with each other by using a touch panel or the like.

The storage unit 23 is configured by a storage medium, such as an HDD, a flash memory, or a removable SD card. The storage unit 23 stores and manages various data, such as wireless communication network information, data transmission/reception information, image data, and applications. HDD stands for Hard Disk Drive.

An example of the power supply unit 24 is a battery. The power supply unit 24 supplies power to each of the hardware devices (the display unit 21, the operation unit 22, the storage unit 23, the control unit 25, . . . , RAM 32). Note that the power supply unit 24 may acquire power from an external AC power supply or an external DC power supply and supply the power to each of the hardware devices.

An example of the control unit 25 is a central processing unit (CPU). The control unit 25 performs overall control of the communication device (11, 13).

The function unit 26 is hardware for enabling the communication device (11, 13) to execute predetermined processing. When the communication device is the video camera 11, the function unit 26 includes an image input unit (an image pickup unit) and an image processing unit. The function unit 26 processes the input image (a moving image). In contrast, when the communication device is the smartphone 13, the function unit 26 includes a camera and an acceleration sensor. The function unit 26 provides functions associated with the smartphone 13.

The wireless LAN communication unit 27 includes a chip and an antenna that perform wireless LAN communication. The wireless LAN communication unit 27 performs wireless communication complying with the IEEE 802.11 series standard.

The NFC communication unit 28 includes a chip and an antenna that perform communication complying with the NFC standard. Upon detecting a communicable device within the communication range, the NFC communication unit 28 automatically establishes NFC communication with the device. According to the present exemplary embodiment, the NFC communication unit 28 performs wireless communication complying with the NFC standard. However, the NFC communication unit 28 may use another short range wireless communication technology, such as infrared communication (IrDA) or TransferJet, or another wireless communication technology. IrDA stands for Infrared Data Association.

The Bluetooth communication unit 29 includes a chip and an antenna that perform communication complying with the Bluetooth standard. Note that the Bluetooth communication unit 29 can perform communication complying with the Bluetooth Low Energy (BLE) standard that enables short-range communication with low power consumption. Alternatively, the Bluetooth communication unit 29 may perform communication using a short range wireless communication technology, such as ZigBee or TransferJet.

The mobile communication unit 30 includes a chip and an antenna that perform mobile communication complying with the 3GPP standard. In addition to the communication up to 4G which are already standardized by 3GPP, the mobile communication unit 30 may perform communication complying with the 5G or later standard which will be standardized in the future or may perform communication at public access points (hotspots) where authentication is based on the subscriber information. Note that the SIM that stores the subscriber information required for the mobile communication is included in the mobile communication unit 30 of a master terminal (described below). 3GPP stands for Third Generation Partnership Project.

The ROM 31 stores a program which is a set of control instructions. A variety of operations described below are provided by the control unit 25 executing the control program stored in the ROM 31. The RAM 32 is used as a work memory and a temporary storage area of data when the program is executed.

As used herein, a terminal that holds subscriber information is referred to as a "master terminal", and a terminal that receives the subscriber information transferred from the master terminal is referred to as a "slave terminal". Hereinafter, the control and processing are described on the assumption that the smartphone 13 is used as a master terminal and the video camera 11 is used as a slave terminal.

Note that the master terminal and the slave terminal are not limited to a smartphone and a video camera, respectively, but may be a variety of devices having a mobile communication function.

FIG. 3 is a flowchart of the control performed by the master terminal when the subscriber information is transferred from the master terminal to the slave terminal (steps S11 to step S16) and, thereafter, is restored from the slave terminal (steps S17 to step S21). According to the present exemplary embodiment, the slave terminal does not have pre-registered information indicating that the master terminal has a voice call function.

First, in step S11, the master terminal starts an application for transferring subscriber information (hereinafter referred to as a "subscriber information transfer application") in response to an instruction from the user. When the subscriber information transfer application is started, a subscriber information transfer start button is displayed on the UI of the master terminal. The subscriber information transfer start button is a button that serves as a trigger for transfer of subscriber information to the slave terminal.

In step S12, the master terminal determines whether the subscriber information transfer start button has been pressed. If the subscriber transfer start button has not been pressed (step S12: N), the subsequent subscriber information transfer processing is not performed. However, if the subscriber information transfer start button has been pressed, the processing proceeds to step S13. Note that the "subscriber information transfer start button" is the same as a "transfer start button" set forth in FIG. 3.

In step S13, the master terminal performs short range wireless communication with the slave terminal to which the subscriber information is to be transferred by using NFC and pairs with the slave terminal. Note that, in step S13 illustrated in FIG. 3, pairing by short range wireless communication using NFC is described as "pairing with slave terminal by NFC touch".

Subsequently, in step S14, the master terminal connects to the slave terminal by Bluetooth. Thereafter, the master terminal and the slave terminal maintain the Bluetooth connection until the mode in which the slave terminal holds the subscriber information transferred from the master terminal is terminated (hereinafter, referred to as a "subscriber information transferred mode"). Thus, communication between the master terminal and the slave terminal is provided via Bluetooth.

After the Bluetooth connection with the slave terminal is established (after step S14) and before the subscriber information is transferred to the slave terminal, the master terminal transmits the information regarding its own functions (the functions providable by the master terminal) to the slave terminal (step S15). The information is referred to as "function information".

The function information indicates whether the master terminal supports each of functions needed to provide services using a mobile communication network. Examples of the function include a voice call function, an SMS function, a packet communication function (an IP data communication function), and a tethering function. FIG. 4A illustrates an example of the function information when the master terminal is a smartphone, and FIG. 4B illustrates an example of the function information when the master terminal is a video camera. SMS stands for Short Message Service.

In step S15, the master terminal notifies the slave terminal of the function information in FIG. 4A, so that the slave terminal registers therein information indicating that the master terminal has a voice call function.

After notifying the slave terminal of its own function information, the master terminal sends and transfers the subscriber information to the slave terminal via Bluetooth communication (step S16). The subscriber information is retained by the slave terminal as long as the subscriber information transferred mode remains unchanged. According to the present exemplary embodiment, the master terminal transfers the subscriber information to the slave terminal together with the phone number information. According to the present exemplary embodiment, through the processes in steps S15 and S16, the function information held by the master terminal is sent to the slave terminal at the same time as the subscriber information is transferred to the slave terminal.

After the subscriber information is transferred, the subscriber information transfer end button is displayed on the UI of the master terminal. The subscriber information transfer end button is a button that serves as a trigger for terminating the subscriber information transferred mode. This button is pressed in order for the slave terminal to restore the transferred subscriber information to the master terminal (communication right restoration in FIG. 1).

In step S17, the master terminal determines whether the subscriber information transfer end button has been pressed. If the subscriber information transfer end button has not been pressed (step S17: N), communication right restoration to the master terminal does not occur. The term "transfer end button" set forth in step S17 illustrated in FIG. 3 is the same as the "subscriber information transfer end button".

When the subscriber information transfer end button is pressed, the master terminal sends, to the slave terminal, a message indicating completion of the subscriber information transfer via Bluetooth communication (step S18).

The master terminal determines whether as a response to the message sent in step S18, an acknowledgement indicating acceptance of end of subscriber information transfer is received from the slave terminal (step S19). Upon receiving the acknowledgement, the master terminal closes the Bluetooth connection with the slave terminal (step S20).

Thereafter, the master terminal ends the subscriber information transfer application (step S21). In this manner, a series of subscriber information transfer control operations performed by the master terminal is completed.

In the above example, the operations to press the buttons of the UI are performed as a trigger to start transfer of the subscriber information and a trigger to end the subscriber information transferred mode. However, the triggers are not limited thereto. For example, the triggers may be other operations, such as voice instructions.

In addition, while the step of ending the subscriber information transfer application (step S21) is illustrated in FIG. 3, the control described in the flowchart described below may be performed with the subscriber information transfer application running. Alternatively, the subscriber information transfer application may be terminated, and an operation to start the subscriber information transfer application may be performed as needed.

As illustrated in FIG. 3, while the present exemplary embodiment has been described with reference to short range wireless communication using NFC as a technique for pairing the master terminal with the slave terminal, the technique is not limited thereto. For example, the master terminal and the slave terminal may be connected to each other by a wireless LAN, Bluetooth, or another communication method, and the slave terminal may be registered by operating the application. Furthermore, as illustrated in FIG. 3, while the present exemplary embodiment has been described with reference to transfer of the subscriber information to the slave terminal via Bluetooth, the subscriber information may be transferred by using a wireless LAN, NFC, or other communication technologies.

As illustrated in FIG. 3, while the present exemplary embodiment has been described with reference to the master terminal that sends the subscriber information to the slave terminal after sending the function information thereof to the slave terminal, the master terminal may send the function information to the slave terminal after sending the subscriber information.

FIG. 5A is a flowchart of the control performed by the slave terminal when the subscriber information is transferred from the master terminal to the slave terminal and thereafter the transferred subscriber information is restored to the master terminal.

In step S31, the slave terminal starts an application for receiving (taking over) the subscriber information first. This application is a subscriber information take-over application. However, since the subscriber information take-over application works in cooperation with the subscriber information transfer application started in step S11 illustrated in FIG. 3 (in the master terminal), the subscriber information take-over application can be also referred to as a "subscriber information transfer application (in the slave terminal)".

Subsequently, in step S32, the slave terminal performs short range wireless communication with the master terminal that holds the subscriber information by using NFC and pairs with the master terminal. Subsequently, in step S33, the slave terminal connects to the master terminal by Bluetooth. Thereafter, the master terminal and the slave terminal maintain the Bluetooth connection until the subscriber information transferred mode is terminated. Thus, communication between the master terminal and the slave terminal is provided via Bluetooth.

After establishing the Bluetooth connection with the master terminal, the slave terminal receives information regarding the functions providable by the master terminal from the master terminal (step S34). The function information in step S34 is that described in FIGS. 4A and 4B. After receiving the function information from the master terminal, the slave terminal receives (takes over) the subscriber information from the master terminal via Bluetooth communication (step S35).

Note that as described above with reference to FIG. 3, control of terminating the subscriber information transferred mode is performed by the master terminal (step S17 in FIG. 3). In step S36, the slave terminal determines whether a subscriber-information transfer completion message is received from the master terminal. If the slave terminal receives a subscriber-information transfer completion message (step S36: Y), the processing proceeds to step S37.

In step S37, the slave terminal sends back an acknowledgement to accept the termination of the subscriber information transferred mode to the master terminal via Bluetooth communication. Thereafter, the slave terminal closes the Bluetooth connection with the master terminal (step S38).

After step S38 is performed, the slave terminal ends the subscriber information transfer application (step S39). In this way, control of the series of subscriber information transfer operations performed by the slave terminal is completed.

In addition, while the step of terminating the subscriber information transfer application (step S39) is illustrated in FIG. 5A, the control in the flowchart described below may be performed with the subscriber information transfer application running. Alternatively, the subscriber information transfer application may be terminated, and an operation to start the subscriber information transfer application may be performed as needed.

The processing related to pairing by NFC and Bluetooth communication described in FIG. 3 and FIG. 5A is a well-known technique. Accordingly, detailed description thereof is not repeated.

Voice call control between a caller terminal and the slave terminal in cooperation with the master terminal according to the present exemplary embodiment is described below with reference to FIG. 5B.

When the slave terminal performs voice call with the caller terminal in cooperation with the master terminal, the processes in steps S35 to S37 in FIG. 5A are changed to those in FIG. 5B. That is, after receiving the subscriber information from the master terminal in step S35 (after the subscriber information is transferred), the slave terminal connects to the mobile communication network in step S41. Subsequently, in step S42, voice/data communication is performed over the mobile communication network.

The process in step S42 is described in more detail below with reference to FIGS. 6 to 9. After step S42 is performed, the slave terminal determines in step S36 whether the subscriber-information transfer completion message is received from the master terminal. If the slave terminal receives the subscriber-information transfer completion message (step S36: Y), the processing proceeds to step S43.

In step S43, the slave terminal closes the connection with the mobile communication network. Subsequently, in step S37, the slave terminal returns acknowledgement indicating acceptance of termination of subscriber information transfer to the master terminal. After step S37 is performed, the same processing as in steps S38 and S39 illustrated in FIG. 5A is performed.

Incoming Call Control and Voice Call Control of Embodiment

The processing in step S42 illustrated in FIG. 5B is described in detail below with reference to FIGS. 6 to 9. That is, the incoming call control and voice call control are described, which are performed after the subscriber information is transferred from a master terminal holding the subscriber information to a slave terminal.

Figure 6:
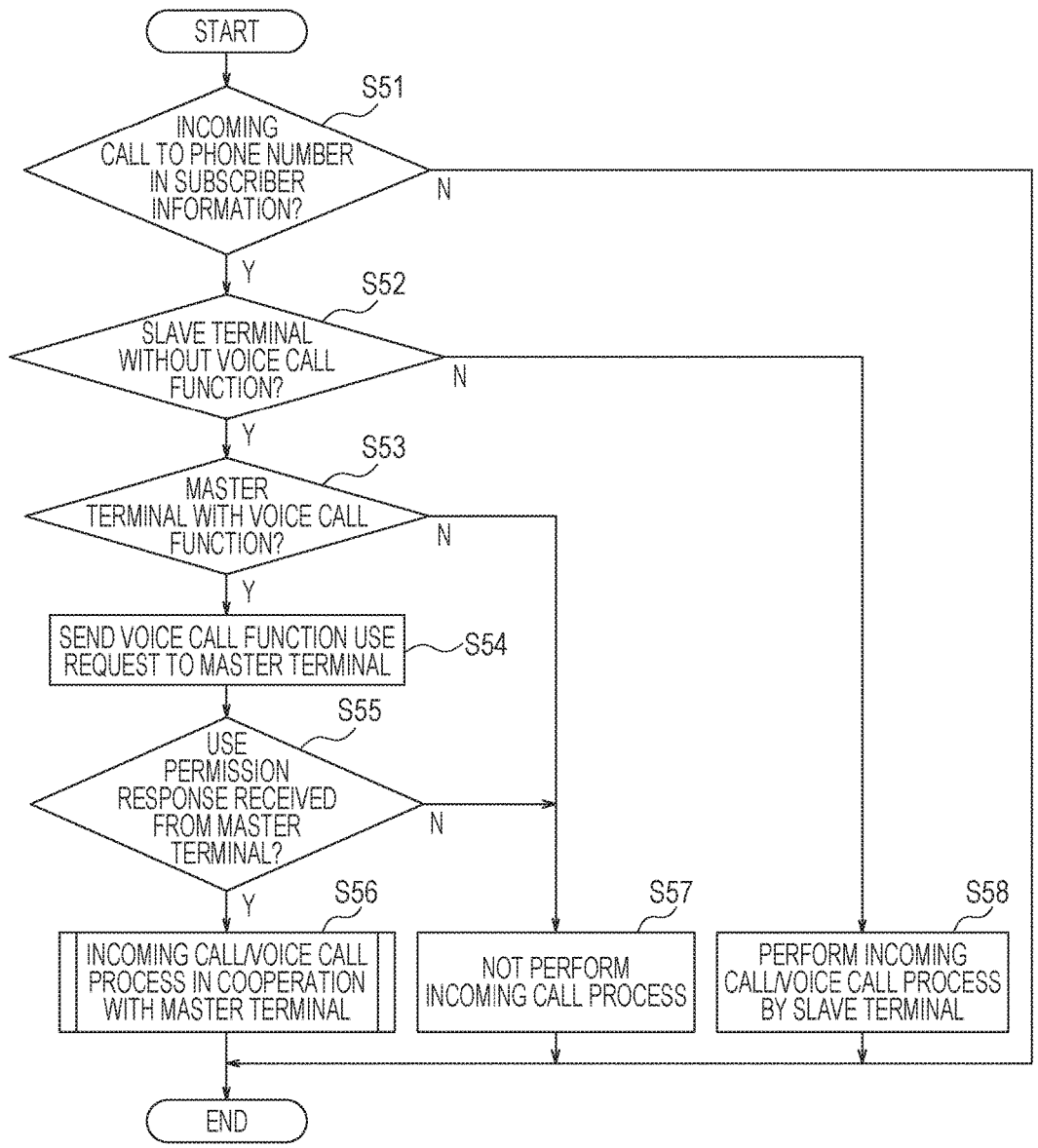
FIG. 6 illustrates the flow of the voice/data communication processing performed by a slave terminal according to the embodiment of the disclosure.
Figure 7:
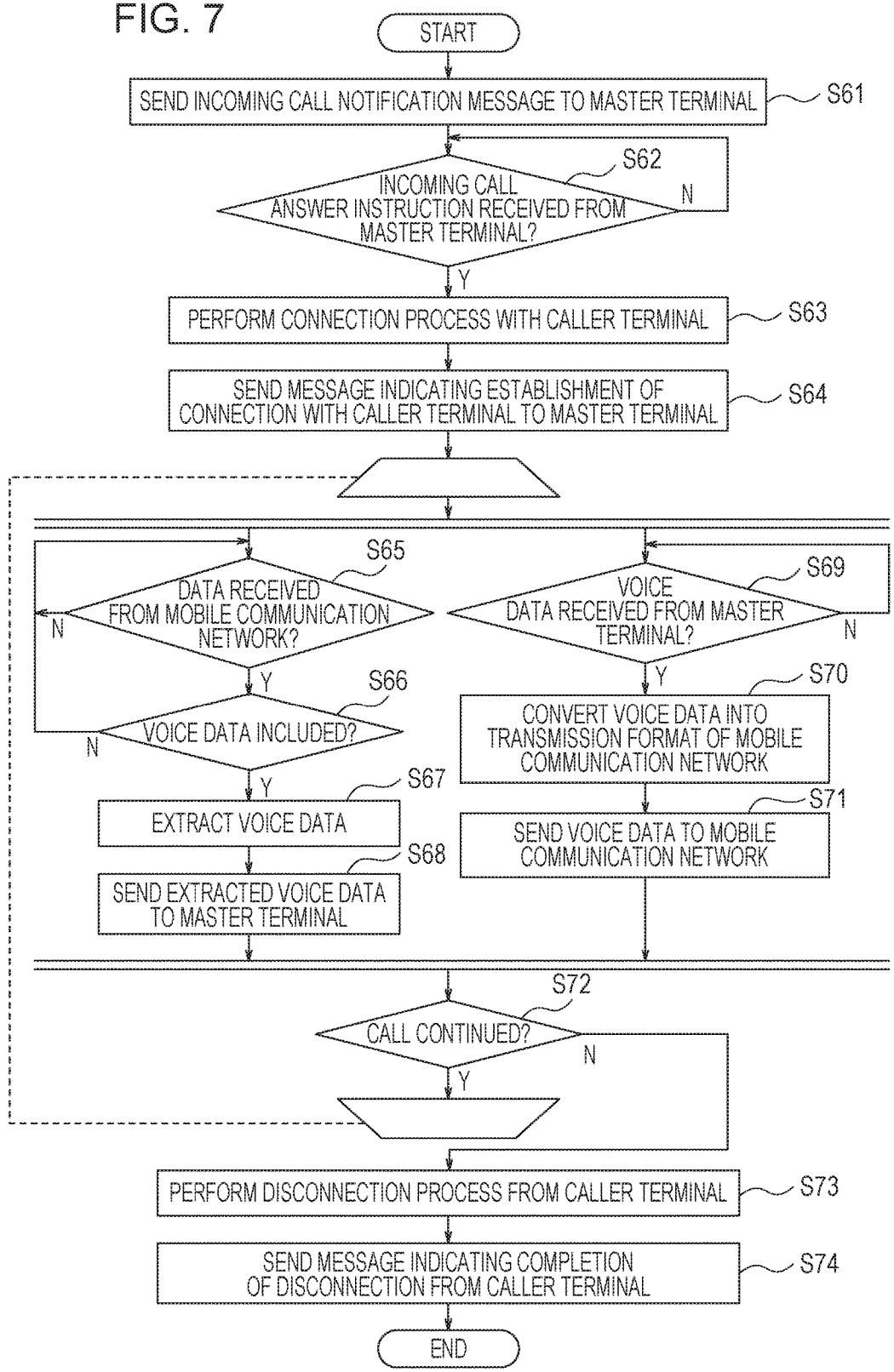
FIG. 7 illustrates incoming call processing and voice call processing performed by the slave terminal according to the embodiment of the disclosure.
Figure 8:
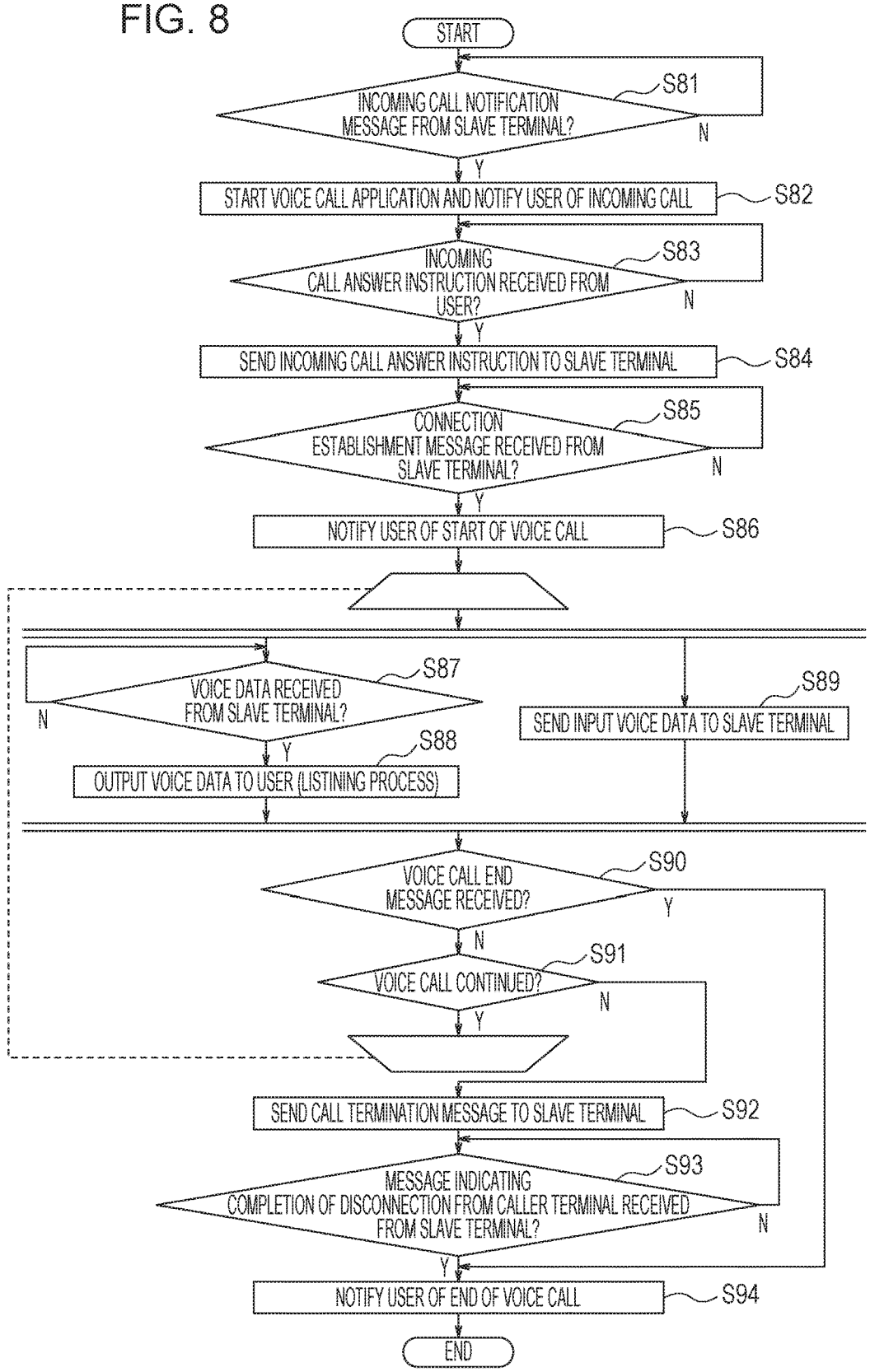
FIG. 8 illustrates incoming call processing and voice call processing performed by the master terminal according to the embodiment of the disclosure.

FIG. 6 is a flowchart illustrating the incoming call control and the voice call control performed by the slave terminal according to the present exemplary embodiment. Since the flowchart illustrated in FIG. 6 indicates the process performed in step S42, the process is performed after the slave terminal has already received the subscriber information transferred from the master terminal and has been connected to the mobile communication network. The direct communication between the master terminal and the slave terminal in the flowcharts illustrated in FIGS. 6 to 8 is performed by using Bluetooth. However, the direct communication may be performed by using other wireless communication, such as wireless LAN communication, NFC, infrared communication, TransferJet, or ZigBee.

In step S51, the slave terminal determines whether there is an incoming call to the phone number included in the subscriber information transferred from the master terminal.

If there is an incoming call to the phone number included in the subscriber information (step S51: Y), the slave terminal determines in step S52 whether the slave terminal itself is a terminal without having a voice call function. According to the present exemplary embodiment, since the slave terminal is a video camera and does not have a voice call function, the determination in step S52 is yes (Y), and the processing proceeds to step S53.

However, if the slave terminal has a voice call function (step S52: N), the processing proceeds to step S58. In this case, the slave terminal is, for example, a smartphone. In step S58, the slave terminal performs the incoming call and voice call processing installed for smartphones.

In the case where the slave terminal is a video camera (that is, when the slave terminal has no voice call function), the slave terminal determines in step S53 whether the master terminal has a voice call function. If the master terminal does not have a voice call function, the slave terminal does not send a voice call function use request to the master terminal, and the incoming call process is not performed (step S57). Note that, in step S57, instead of not performing the incoming call process, the slave terminal may send back a response to reject the incoming call to the caller terminal.

However, if, in step S53, it is determined that the master terminal has a voice call function, the slave terminal sends a voice call function use request to the master terminal (step S54). Thereafter, the slave terminal waits for a voice call function use permission response from the master terminal (step S55).

When the slave terminal does not receive the voice call function use permission response from the master terminal (step S55: N), the processing proceeds to step S57, where the incoming call process is not performed.

If the slave terminal receives the voice call function use permission response from the master terminal, the slave terminal performs the incoming call process and voice call process in cooperation with the master terminal (step S56). Even when the slave terminal does not have a voice call function, the slave terminal can perform the voice call process by operating in cooperation with the master terminal having a voice call function.

Incoming Call Process and Voice Call Process in Cooperation with Master Terminal The control performed by the slave terminal in the incoming call and the voice call processes in cooperation with the master terminal in step S56 is described below with reference to FIG. 7.

Upon receiving an incoming call directed to the phone number in the subscriber information, the slave terminal sends, to the master terminal, a message indicating that there is an incoming call (step S61). Note that the slave terminal may send, to the master terminal, the phone number information of the caller terminal and the name registered in telephone directory information together with the incoming call notification message.

Subsequently, in step S62, the slave terminal determines whether an instruction to answer the incoming call (an incoming call answer instruction) has been sent from the master terminal.

If the incoming call answer instruction has been sent from the master terminal (step S62: Y), the slave terminal performs a connection process to connect with the caller terminal (step S63). In this case, the connection process is performed to connect with the caller terminal on the mobile communication network required for voice call. The connection process is performed by the public wireless communication unit 30 of the slave terminal.

In step S64, the slave terminal sends, to the master terminal, a message indicating establishment of connection with the caller terminal. After being connected with the caller terminal, the slave terminal starts voice call (listening and speaking) with the caller terminal.

Listening in Voice Communication with Caller Terminal

A listening process in voice communication with the caller terminal (steps S65 to S68) is described first.

In step S65, the slave terminal determines whether data has been received from the mobile communication network. If the slave terminal has received data from the mobile communication network (step S65: Y), the processing proceeds to step S66.

In step S66, the slave terminal determines whether the received data includes voice data. If the received data includes voice data (step S66: Y), the processing proceeds to step S67. However, if the received data include voices no voice data, the processing returns to step S65.

In step S67, the slave terminal extracts voice data from the received data. Steps S65 to S67 are performed by the mobile communication unit 30 of the slave terminal.

Since the slave terminal does not have a voice call function (components for a voice call, such as a loudspeaker and a microphone), the slave terminal cannot output the voice data to the user of the slave terminal (the user cannot listen to the phone call). Thus, in step S68, the slave terminal sends the extracted voice data to the master terminal and outputs the voice data to the user of the slave terminal by using the voice call function of the master terminal (components for voice call, such as a loudspeaker).

Speaking in Voice Communication with Caller Terminal

A speaking process in voice communication with the caller terminal (steps S69 to S71) is described below.

When speaking from the slave terminal, the user inputs voice data by using the voice call function (a microphone) of the master terminal, since the slave terminal does not have a voice call function.

In step S69, the slave terminal determines whether the voice data of the user has been received from the master terminal. If the slave terminal has received the voice data from the master terminal (step S69: Y), the processing proceeds to step S70.

In step S70, the slave terminal converts the voice data into the transmission format defined by the mobile communication network. Thereafter, in step S71, the slave terminal sends the voice data to the mobile communication network. Steps S70 and S71 are performed by the mobile communication unit 30 of the slave terminal.

Even when a slave terminal that does not have a voice call function is connected to a mobile communication network during the series of control processes described above, the slave terminal can receive an incoming call and make voice call in cooperation with the master terminal having a voice call function.

Terminating Voice Call

A process performed when the voice call is terminated (step S72 to step S74) is described below.

In step S72, the slave terminal determines whether to continue the voice call. For example, when the slave terminal receives the signaling indicating the end of the voice call from the caller terminal, the slave terminal determines not to continue the voice call. Alternatively, upon receiving a voice call termination instruction from the master terminal, the slave terminal determines not to continue the voice call. If the slave terminal determines to terminate the voice call (step S72: N), the processing proceeds to step S73. However, if the slave terminal continues the voice call, the processing returns to steps S65 and S69.

In step S73, the slave terminal performs a disconnection process from the caller terminal. The disconnection process is a process of closing the connection with the caller terminal on the mobile communication network, which is required for performing voice call. The disconnection process is performed by the mobile communication unit 30 of the slave terminal.

After the disconnection process is completed, the slave terminal sends, to the master terminal, a message indicating the completion of disconnection from the caller terminal in step S74. In this way, the slave terminal ends the voice call with the caller terminal.

When the slave terminal receives the signaling indicating the end of the voice call from the caller terminal, the slave terminal sends a voice call end message to the master terminal.

Control Performed by Master Terminal in Incoming Call and Voice Call Process

The control performed by the master terminal in step S56 (the incoming call and voice call process) illustrated in FIG. 6 is described in detail with reference to FIG. 8. The process in FIG. 8 is performed by, for example, the control unit 25 of the master terminal.

In step S81, the master terminal determines whether to receive a message indicating that there is an incoming call (an incoming call notification message) from the slave terminal. If the master terminal has received the incoming call notification message (step S81: Y), the processing proceeds to step S82.

In step S82, the master terminal starts a voice call application (hereinafter referred to as a "voice call APL") installed in the master terminal to notify the user of an incoming call. Notification of the incoming call is made to the user by, for example, outputting predetermined sound from the loudspeaker of the master terminal.

In step S83, the master terminal determines whether an instruction to answer the incoming call (the incoming call answer instruction) is received from the user. Upon receiving the incoming call answer instruction (step S83: Y), the processing proceeds to step S84. Determination as to whether the incoming call answer instruction has been received from the user is made based on, for example, whether a predetermined button of the master terminal is pressed.

In step S84, the master terminal sends, to the slave terminal, a message indicating that the incoming call answer instruction has been received from the user. Thereafter, the slave terminal performs a connection process with the caller terminal (step S63 in FIG. 7). After the connection is established, the slave terminal sends, to the master terminal, a message indicating that the connection has been established (step S64 in FIG. 7).

In step S85, the master terminal determines whether the message sent from the slave terminal in step S64 has been received. If the connection establishment message from the slave terminal has been received (step S85: Y), the processing proceeds to step S86.

In step S86, the master terminal notifies the user that the master terminal is in a voice call ready mode and starts the voice call. The notification is made to the user by, for example, displaying predetermined characters on the UI of the master terminal.

Processing During Voice Call

The processing performed during the voice call is described below. During the voice call, the slave terminal receives data via the mobile communication network (step S65 and S66 in FIG. 7). Thereafter, the slave terminal extracts voice data from the received data (step S67 in FIG. 7) and sends the voice data to the master terminal (step S68).

In step S87, the master terminal determines whether the voice data has been received from the slave terminal. If the voice data has been received from the slave terminal (step S87: Y), the processing proceeds to step S88.

In step S88, the master terminal outputs the voice data to the user by using its own voice call function (the loudspeaker).

In addition, the master terminal sends, to the slave terminal, the voice data (user's voice) input by the user using the microphone of the master terminal (step S89). The slave terminal converts the voice data into a format for transmission over the mobile communication network (step S70 in FIG. 7) and sends the voice data to the mobile communication network (step S72). In this manner, voice telephone call can be made.

In step S90, the master terminal determines whether a voice call end message (call end signaling from the caller terminal) has not been transmitted from the slave terminal. If the voice call end message has been received from the slave terminal (step S90: Y), the processing proceeds to step S94, where the user is notified of end of the voice call, and the voice call ends. If the voice call end message has not been received from the slave terminal, the processing proceeds to step S91.

In step S91, the master terminal determines whether to continue the voice call on the basis of whether the master terminal has received a voice call termination instruction from the user. If the master terminal has received a voice call termination instruction from the user (step S91: N), the processing proceeds to step S92.

In step S92, the master terminal instructs the slave terminal to terminate the voice call (sends the message). Upon receiving the message, the slave terminal ends the voice call (steps S72 to S73) and sends, to the master terminal, a message indicating completion of disconnection from the caller terminal (step S74).

In step S93, the master terminal determines whether the message sent from the slave terminal in step S74 (a disconnection completion message) has arrived. If the message sent from the slave terminal in step S74 has arrived (step S93: Y), the master terminal notifies the user of the end of the voice call (step S94) and ends the voice call.

Figure 9:
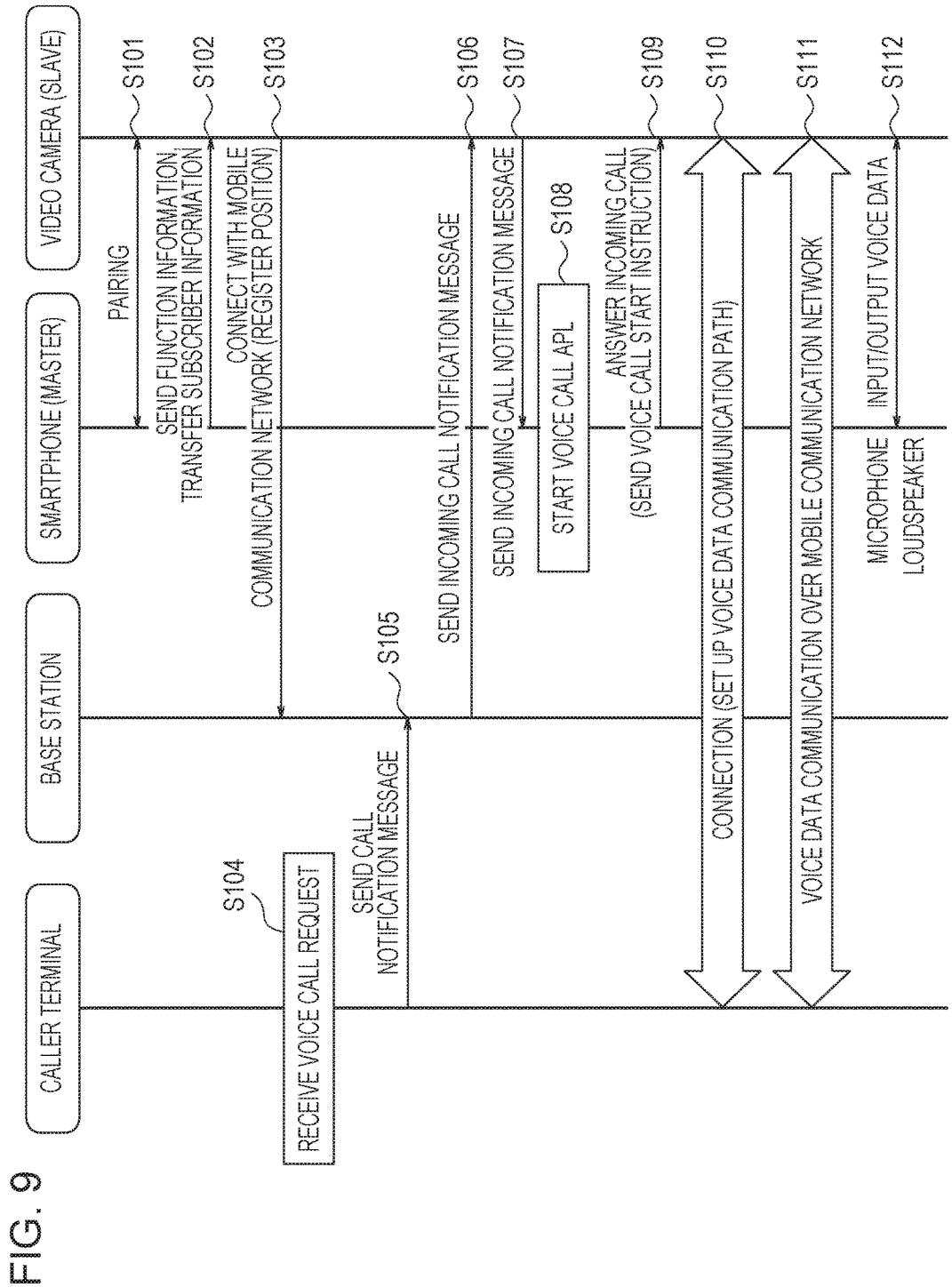
FIG. 9 is a flowchart illustrating an overall process flow performed by the communication system according to the embodiment of the disclosure.

FIG. 9 is a flowchart illustrating the overall flow of the incoming call process and the voice call process performed by the master terminal, the slave terminal, the base station, and the caller terminal in the series of control processes described above.

As illustrated in FIG. 9, in step S101, pairing is performed between the master terminal (a smartphone) and the slave terminal (a video camera). Thereafter, in step S102, the master terminal sends a message indicating the function information to the slave terminal. In addition, the master terminal transfers the subscriber information to the slave terminal. Upon receiving the function information and the subscriber information from the master terminal, the slave terminal connects to the base station via the mobile communication network in step S103.

If, in step S104, the caller terminal receives a voice call request from the user of the caller terminal, the caller terminal sends a call notification message to the base station in step S105. Thereafter, in step S106, the call notification message is sent from the base station to the slave terminal as an incoming call notification message.

In step S107, the slave terminal sends, to the master terminal, a message indicating that the slave terminal has received an incoming call. Upon receiving the incoming call notification message from the slave terminal, the master terminal starts the voice call APL in step S108.

Subsequently, if the master terminal receives an incoming call answer instruction from the user of the master terminal, the master terminal sends an incoming call answer instruction (a voice call start instruction) to the slave terminal in step S109.

Upon receiving the incoming call answer instruction from the master terminal, the slave terminal performs a connection process with the caller terminal in step S110. Through the connection process, the slave terminal and the caller terminal are connected with each other. That is, a voice data communication path via the mobile communication network is established between the slave terminal and the caller terminal.

Subsequently, in step S111, the slave terminal performs a voice call (transmission and reception of voice data) with the caller terminal in cooperation with the master terminal. That is, the slave terminal uses the master terminal to perform voice data communication with the caller terminal over the mobile communication network.

In listening during telephone conversations, in step S112, voice data from the caller terminal is sent from the slave terminal to the master terminal, and the voice data is output from the loudspeaker of the master terminal to the user. In speaking during telephone conversations, in step S112, voice data input from the microphone of the master terminal is sent from the master terminal to the slave terminal and, thereafter, the voice data is sent from the slave terminal to the caller terminal via the mobile communication network.

Effect of Embodiment

According to the present exemplary embodiment, even when a slave terminal not having a voice call function is connected to a mobile communication network, the slave terminal can receive incoming calls and make voice calls in cooperation with a master terminal having a voice call function. Therefore, after receiving an incoming call notification message, the slave terminal not having a voice call process function can process the incoming call without transferring the subscriber information to the master terminal capable of performing a voice call process (without restoration of the communication right). In addition, when sending (transferring) the subscriber information to the slave terminal, the master terminal further sends the function information thereof to the slave terminal. Thus, the function information of the master terminal need not be registered in the slave terminal in advance, resulting in improvement in usability for the users.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2016-246227 filed Dec. 20, 2016, which is hereby incorporated by reference herein in its entirety.

What is claimed is:

1. A communication device comprising:
   a transmitting unit configured to transmit, to a second communication device having no voice call function, subscriber information through predetermined wireless communication without using a mobile communication network;
   a receiving unit configured to receive an incoming call notification message directed to a phone number in the subscriber information from the second communication device through the predetermined wireless communication; and
   a communication unit configured to communicate voice data with the second communication device by using the predetermined wireless communication upon receiving an incoming call notification message.

2. The communication device according to claim 1, further comprising:
   a notification unit configured to notify the second communication device of function information when the transmitting unit transmits the subscriber information, the function information indicating functions provided by the communication device and used over the mobile communication network.

3. The communication device according to claim 1, further comprising:
   an output unit configured to externally output a message indicating that the incoming call notification message is received from the second communication device.

4. The communication device according to claim 1, further comprising:
   a reception unit configured to receive, from a user, an instruction as to whether the incoming call is to be answered or not; and
   an instruction unit configured to instruct the second communication device, through the predetermined wireless communication, to answer the incoming call via the mobile communication network if the instruction to answer the incoming call is received.

5. The communication device according to claim 1, further comprising:
a loudspeaker unit configured to output, in a form of sound, voice data sent from the second communication device and received by the communication unit.

6. The communication device according to claim 1, wherein the function information indicates whether at least one of a voice communication function, an SMS function, a packet communication function, and a tethering function is provided.

7. The communication device according to claim 1, wherein the predetermined wireless communication is any one of wireless LAN communication, Bluetooth communication, NFC, infrared communication, TransferJet, and ZigBee.

8. A communication device not having a voice call function over a mobile communication network, comprising:
a receiving unit configured to receive, from a second communication device, subscriber information required for making mobile communication over the mobile communication network by using predetermined wireless communication without using the mobile communication network;
a transmitting unit configured to, if an incoming call notification message directed to a phone number in the subscriber information is received, transmit a message indicating the incoming call to the second communication device through the predetermined wireless communication; and
a communication unit configured to communicate voice data with the second communication device by using the predetermined wireless communication when answering the incoming call.

9. The communication device according to claim 8, further comprising:
an acquisition unit configured to acquire function information indicating functions provided by the second communication device and used over the mobile communication network; and
a determination unit configured to determines whether the second communication device has a voice call function based on the acquired function information,
wherein if the second communication device does not have a voice call function, the transmitting unit does not send the incoming call notification message to the second communication device.

10. The communication device according to claim 8, wherein the function information indicates whether at least one of a voice communication function, an SMS function, a packet communication function, and a tethering function is provided.

11. The communication device according to claim 8, wherein the predetermined wireless communication is any one of wireless LAN communication, Bluetooth communication, NFC, infrared communication, TransferJet, and ZigBee.

12. A method for controlling a communication device comprising:
transmitting, to a second communication device not having a voice call function, subscriber information through predetermined wireless communication without using a mobile communication network;
receiving an incoming call notification message directed to a phone number in the subscriber information from the second communication device through the predetermined wireless communication; and
communicating voice data with the second communication device by using the predetermined wireless communication upon receiving the incoming call notification message.

13. The method according to claim 12, further comprising:
notifying the second communication device of function information when the transmitting transmits the subscriber information, the function information indicating functions provided by the communication device and used over the mobile communication network.

14. The method according to claim 12, further comprising:
externally outputting a message indicating that the incoming call notification message is received from the second communication device.

15. The method according to claim 12, further comprising:
receiving, from a user, an instruction as to whether the incoming call is to be answered or not; and
instructing the second communication device, through the predetermined wireless communication, to answer the incoming call via the mobile communication network if the instruction to answer the incoming call is received.

16. A non-transitory computer-readable recording medium storing a program causing a communication device to execute a process including:
transmitting, to a second communication device not having a voice communication function, subscriber information through predetermined wireless communication without using a mobile communication network;
receiving an incoming call notification message directed to a phone number in the subscriber information from the second communication device through the predetermined wireless communication; and
communicating voice data with the second communication device by using the predetermined wireless communication upon receiving the incoming call notification message.

17. The non-transitory computer-readable recording medium according to claim 16, further comprising:
notifying the second communication device of function information when the transmitting transmits the subscriber information, the function information indicating functions provided by the communication device and used over the mobile communication network.

18. The non-transitory computer-readable recording medium according to claim 16, further comprising:
externally outputting a message indicating that the incoming call notification message is received from the second communication device.

19. The non-transitory computer-readable recording medium according to claim 16, further comprising:
receiving, from a user, an instruction as to whether the incoming call is to be answered or not; and
instructing the second communication device, through the predetermined wireless communication, to answer the incoming call via the mobile communication network if the instruction to answer the incoming call is received.

* * * * *